United States Patent
Johnson

(10) Patent No.: US 6,313,448 B1
(45) Date of Patent: Nov. 6, 2001

(54) ADHESIVE BONDING METHOD AND DEVICE

(75) Inventor: Michael A. Johnson, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/422,609

(22) Filed: Oct. 21, 1999

(51) Int. Cl.[7] ............... H05B 6/02; C03C 27/04
(52) U.S. Cl. ............ 219/633; 219/603; 219/634; 156/272.4; 156/274.2
(58) Field of Search ............... 219/633, 634, 219/635, 603; 156/272.4, 274.2, 379.6, 379.7, 380.2

(56) References Cited

U.S. PATENT DOCUMENTS

| | | |
|---|---|---|
| 4,442,129 | 4/1984 | Niwa et al. . |
| 4,602,139 | 7/1986 | Hutton et al. . |
| 4,710,539 | 12/1987 | Siadat et al. . |
| 4,749,833 | 6/1988 | Novorsky et al. . |
| 4,950,348 * | 8/1990 | Larsen .................. 219/633 |
| 5,040,844 | 8/1991 | Stolz et al. . |
| 5,082,736 | 1/1992 | Bravet et al. . |
| 5,086,088 | 2/1992 | Kitano et al. . |
| 5,089,076 | 2/1992 | Leach et al. . |
| 5,089,536 | 2/1992 | Palazzotto . |
| 5,240,542 | 8/1993 | Miller et al. . |
| 5,264,058 | 11/1993 | Hoagland et al. . |
| 5,280,067 | 1/1994 | Tarbutton et al. . |
| 5,442,159 | 8/1995 | Shank . |
| 5,445,694 * | 8/1995 | Gillner et al. ................. 219/633 |
| 5,486,257 | 1/1996 | Onishi . |
| 5,518,560 * | 5/1996 | Li ................................ 219/633 |
| 5,610,243 | 3/1997 | Vietti et al. . |
| 5,620,794 | 4/1997 | Burkart et al. . |
| 5,660,753 | 8/1997 | Lingnau . |
| 5,665,823 | 9/1997 | Saxena et al. . |
| 5,865,940 | 2/1999 | Li . |
| 5,919,388 | 7/1999 | Kawano et al. . |

FOREIGN PATENT DOCUMENTS

| | | |
|---|---|---|
| 0 111 252 | 6/1984 | (EP) . |
| 0 377 376 | 7/1990 | (EP) . |
| 0 767 149 | 4/1997 | (EP) . |
| 2 064 506 | 6/1981 | (GB) . |
| WO 99/16618 | 4/1999 | (WO) . |

OTHER PUBLICATIONS

3M Brochure entitled "Application Procedures for Pressure-Sensitive Body Side Moldings", published more than one year before Oct. 29, 1999.

* cited by examiner

Primary Examiner—Philip H. Leung
(74) Attorney, Agent, or Firm—Brian E. Szymanski; Harold C. Knecht, III

(57) ABSTRACT

A bonding method which includes heating an electrically conductive substrate with an induction heating system. The electrically conductive substrate is suitable for receiving a bonding agent which includes a pressure sensitive adhesive or a hot melt adhesive. The bonding agent is attached to a non-conductive substrate. The contact surface of the substrate is heated with the induction heating system to elevate the temperature of the contact surface. The heated surface enhances the wet out of the bonding agent upon application of the bonding agent onto the substrate.

20 Claims, 1 Drawing Sheet

ADHESIVE BONDING METHOD AND DEVICE

FIELD OF THE INVENTION

The present invention relates to a method for bonding substrates together, more particularly to a method which impacts the strength of the bond between a bonding agent and an electrically conductive substrate, and even more particularly to a method utilizing induction heating to heat an electrically conductive substrate before or upon application of the bonding agent to the substrate. The present invention also relates to a device for bonding two substrates which incorporates an induction heating system for improving the bond strength.

BACKGROUND OF THE INVENTION

In bonding processes, it is often important to provide a bonding agent that is capable of providing sufficient green strength in a relatively short period of time in order to hold objects together until the adhesive cures or solidifies. Green strength is equated with the shear strength of the bonding agent. The ability to achieve green strength is often dependent on the wetting of the bonding agent upon application and contact to a substrate. Certain substrates, or their respective physical properties, can adversely affect the wet out properties of the bonding agent. Additionally, processing conditions during application can affect the wet out properties of the bonding agent. The inability to obtain sufficient wet out will result in a weak bond between the bonding agent and the substrate.

SUMMARY OF THE INVENTION

The present invention involves a method for improving the bond strength of bonding agents applied onto electrically conductive substrates. The method of the present invention improves the wet out properties at the contact surface between the bonding agent and an electrically conductive substrate.

The present invention utilizes a non-conductive substrate having a bonding agent attached to at least a portion of the substrate. The bonding agent can be a pressure sensitive adhesive or a hot melt adhesive or it can include at least an exposed layer of a pressure sensitive adhesive or a hot melt adhesive. The utilization of a hot melt adhesive requires the heating of the adhesive to a bondable state. An electrically conductive substrate is then heated with an induction heating system. The electrically conductive substrate is suitable for receiving the bonding agent. The electrically conductive substrate has a greater thermal conductivity than the bonding agent. The contact surface of the substrate is heated to a temperature sufficient to enhance the wet out of the bonding agent upon application onto the substrate.

The pressure sensitive adhesive and hot melt adhesives are generally solid at room temperature and substantially stable in form and dimension. The hot melt adhesive can include thermoplastic hot melt adhesives or thermoset hot melt adhesives. Thermoset hot melt adhesives generally comprise heat-activated adhesives, moisture activated adhesives, radiation or light activated adhesives. The viscosity of the material at the contact surface of the pressure sensitive adhesive or the hot melt adhesive is affected by the elevated temperature of the contact surface of the electrically conductive substrate. The elevated temperature of the electrically conductive substrate enhances the ability of the pressure sensitive adhesive or the hot melt adhesive to wet out the substrate. With pressure sensitive adhesives, the method of the present invention beneficially affects the rate for building adhesive strength. The method results in the formation of a cohesive bond between the bonding agent and the electrically conductive substrate.

The present invention also includes a device for inductively heating a substrate to enhance the wetting properties of a bonding agent applied onto the substrate. The device includes a support for releasably holding a non-conductive substrate with a bonding agent affixed to at least a portion of a major surface of the non-conductive substrate. An induction heating system is attached to at least a portion of the support. The support is positioned near an electrically-conductive substrate. Upon activation of the induction heating system, the electrically conductive substrate is heated to beneficially affect the wet out of the bonding agent on the surface of the electrically conductive substrate.

It is an advantage to inductively heat an electrically conductive substrate in order to enhance the bond between the substrate and a bonding agent. The heated substrate enhances the wet out of the bonding agent at the surface or interfacial contact point between the electrically conductive substrate and the bonding agent.

For purposes of the present invention, the following terms used in this application are defined as follows:

"wet-out" means the ability of the adhesive to spread out over and bond to the contact surface prior to reaching a cured or solid state.

"electrically-conductive" means any ferromagnetic material or inductively responsive material capable of generating heat when subjected to an inductive field;

"non-conductive" means any material which exhibits a resistance to the transmittance of electricity or heat;

"bonding agent" means an adhesive material that is solid at room temperature and substantially stable in form and dimension;

"bondable state" means the adhesive, upon heating, posesses a measurable viscosity and is capable of wetting out upon application to a substrate;

"green strength" means initial holding power of the adhesive to a substrate either before or after initial curing or solidification;

"pressure sensitive adhesive" means adhesives that are normally tacky at room temperature and firmly adhere to a wide variety of dissimilar surfaces upon mere contact without the need for more than finger or hand pressure;

"hot melt adhesive" means a material that is substantially non-tacky at room temperature but is capable of being heated to a viscous state to form a bond to a substrate by wetting out the substrate and subsequently cooling to form a bond;

"tackification" means a state in which the adhesive reaches a temperature at which the adhesive is capable of wetting out and forming a bond with a substrate;

"thermal conductivity (k)" is defined as the time rate of transfer of heat by conduction, through unit thickness, across unit area for unit difference of temperature; and "heat capacity (Cp)" is defined as the quantity of heat required to increase the temperature of a system or substance one degree of temperature;

Other features and advantages will be apparent from the following description of the embodiments thereof, and from the claims.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION

Figure 1:
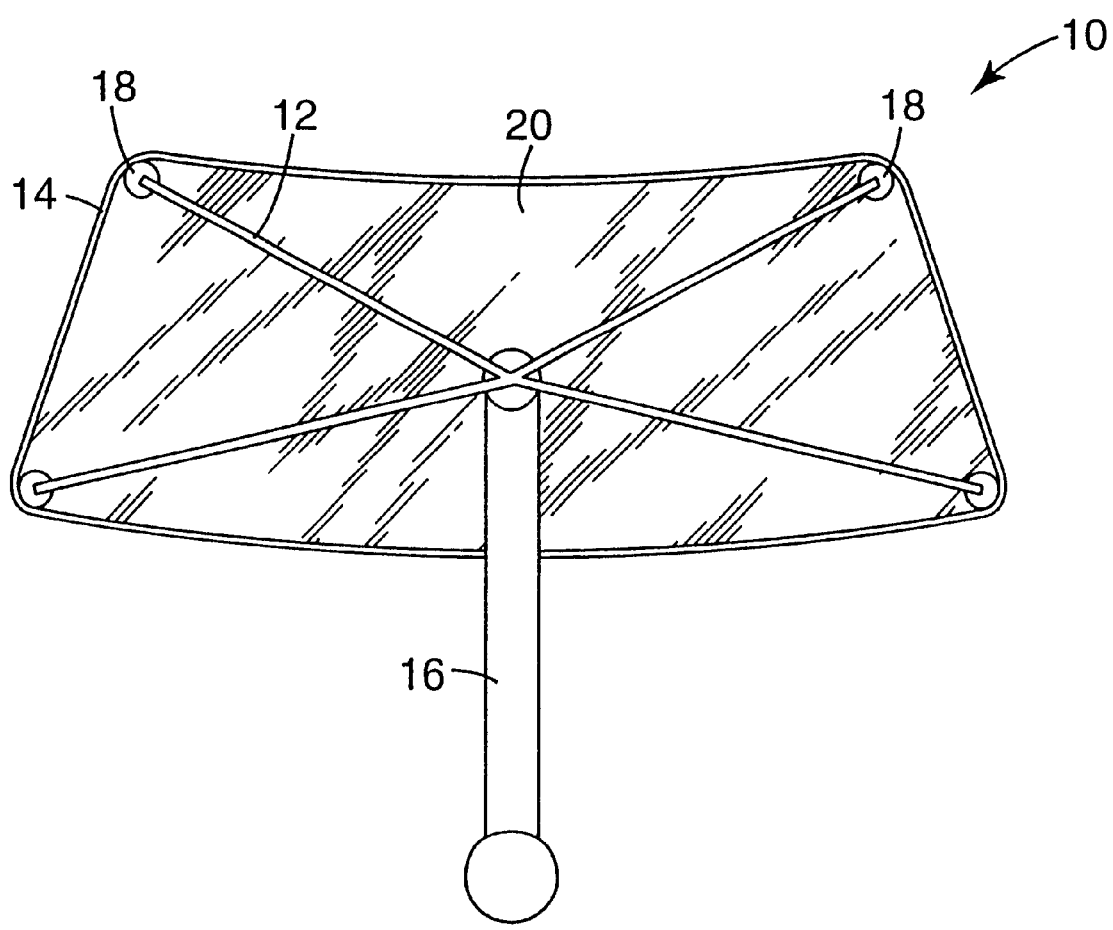
FIG. 1 is a perspective view of a device according to the present invention.

The present invention improves the bond between a bonding agent and an electrically conductive substrate. The method is ideally suited for use in bonding two substrates together wherein at least one substrate is an electrically conductive substrate.

It is often desirable to bond a substrate or article to a metal substrate. This is particularly true in the manufacture of motor vehicles where it is generally necessary to form a bond to a metal substrate or metal surface. Additionally, in an automotive manufacturing environment, the time for forming the bond is generally short in duration because of manufacturing constraints.

Heat-activated, or hot melt, bonding agents are one form of adhesives that have been used in bonding articles to metal surfaces or substrates. Heat-activated, hot-melt adhesives are materials which rely on applied heat to soften the adhesive so that the viscosity of the material will be lowered to a point where it is sufficiently mobile to achieve a condition of flow. This allows it to wet-out against a substrate. The adhesive or sealant solidifies on cooling which results in very rapid bond formation. Hot melt materials have been used extensively in bonding operations where it is desirable to rapidly build green strength simply upon cooling. Hot melt adhesives have also been developed which undergo a latent chemical reaction after application which results in a crosslinking of the adhesive to achieve a thermally irreversible bond.

The utilization of hot-melt adhesives to adhere to metallic substrates can result in the formation of deficient bond strength between the bonding agent and the metal adherend. This deficiency is magnified when the mass of the metal substrate is large relative to the mass of the adhesive. The adhesion between the hot-melt adhesive and metal structure results in low measured adhesive values displaying an adhesive failure mode between the two materials, and an observed quenched skin of adhesive if it is rapidly removed from the adherend. This is an unexpected result in view of the heat capacities of the adhesive and metallic substrates. The heat capacity of a given polymer is not a single value and is represented by a function that depends upon the state of the polymer (crystalline, amorphous, liquid, solid) and on the thermal history. Heat capacity of the polymer in the proximity of the glass transition region is also dependent on the heating rate during the measurement. The relatively high heat capacity of the adhesive would suggest an ability to sustain its temperature for a sufficiently long period of time and retain its low viscosity and ability to wet the metallic substrate, as well as an ability to directionally heat the metal when the two materials are brought into contact with one another. This balance also indicates that increasing the temperature of the adhesive has a direct affect on adhesion and therefore suggests that there should not be an adhesion problem. However, the heat capacity balance fails to address the overall dynamics of the bonding process.

The thermal conductivity of the bonding agent and the electrically conductive substrate address the dynamics of the bonding process. With heat-activated bonding agents, the high heat transfer characteristics of metal can remove heat from the bonding agent at the initial contact interface. The relative difference between thermal conductivity of a metallic material and a hot-melt adhesive is on the order of $10^3$. This difference in thermal conductivity and heat capacity of the metallic substrate and the bonding agent creates a complex, dynamic, and unpredictable balance of thermal management with the objective of maintaining enough fluidity in the bonding agent for a sufficient time to achieve adequate wet-out and bond formation.

The relatively rapid heat transfer capabilities of the metal, coupled with the slow heat transfer through the bonding agent, can result in the solidification or skinning of the outermost layer of the bonding agent which is in direct contact with the metal. The freezing of the hot melt adhesive or sealant bonding surface is observed to occur virtually instantaneously. The rapid solidification of the contact surface of the bonding agent will then result in poor wet out. Thus the overall bond strength may be adversely affected by the wet out conditions and can result in the adhesive failure of the bonding agent.

The present invention involves a method that can facilitate the bond formation process. The method relies on the use of an induction field which is capable of pin-point or localized application of heat to the bondline of a bonding agent assembly. By focusing the thermal energy at the bonding interface, the quenching or freezing of the bonding agent can be overcome. The method of the present invention significantly enhances the wet-out process to electrically conductive substrates. In addition, exposing a bonded assembly prepared from a pressure-sensitive adhesive to an induction field significantly increasing the rate of building adhesive strength to the metallic or painted metal substrate. The utilization of an induction field as an internal source of heat generation in the electrically conductive substrate allows one to avoid potential impact with thermally sensitive components since it only imparts heat where it is needed. In addition, this method serves as a means of minimizing or eliminating environmental effects such as substrate temperature which can vary greatly on a seasonal basis.

In accordance with the method of the present invention, an electrically conductive substrate is heated with an induction heating system to enhance the wet out of a bonding agent applied onto a surface of the substrate. Any electrically conductive substrate which is responsive to an induction field is suitable for use with the present invention. Generally, metal substrates or painted metal substrates are utilized.

A non-conductive substrate is also utilized in the method of the present invention. The present invention is suitable for bonding two substrates together through the application of a bonding agent. The non-conductive substrate does not respond or heat up upon activation of the induction heating system. All non-conductive materials that are capable of receiving or bonding to a bonding agent are suitable for use with the present invention. Examples of non-conductive substrates would include glass, plastic or reinforced composite substrates.

In a preferred embodiment, the method of the present invention is suitable for bonding glass to metal frames. For example, a glass substrate may be bonded to a metal frame of a motor vehicle. Additionally, the glass can include a ceramic frit as a bonding surface for the bonding agent. The method of the present invention is also suitable for use in mounting a glazing or encapsulated glass fixtures onto metal frames.

The bonding agent of the present invention is a material that includes at least one exposed adhesive layer that is a solid at room temperature and is substantially stable in form and dimension. Other layers may include compositions that are suitable for bonding to specific non-conductive substrates. The exposed layer of the bonding agent is responsive to heat and is able to take on flow characteristics upon the application of heat. Preferably, the bonding agent is a pressure sensitive adhesive or a hot melt adhesive.

Pressure-sensitive adhesives represent a unique class of materials that are capable of forming a bond to a substrate through the application of pressure. The use of pressure causes the adhesive to wet out on the substrate. The application of heat is an alternative means of increasing the adhesion performance of the pressure-sensitive adhesive. For pressure sensitive adhesives, the increased performance is measured as a rate of strength build to a particular failure mode exhibited by the pressure-sensitive adhesive to substrates, such as metal or painted metal. The inductive heating forms a bond by improving the wet out capabilities at the bonding surface. The bonds exhibit a cohesive failure mode in a relatively short time period with a minimal affect on the adherends. This enables pressure sensitive adhesives to be used in applications demanding high performance in relatively short time periods, such as in manufacturing of a motor vehicle.

Hot melt adhesives are also suitable for use with the inventive method. Hot melt adhesives include both thermoplastic and thermosettable materials. Examples of thermoplastic hot melt adhesives can include, but are not limited to, polyesters, urethanes (ether ester), vinyl acetate copolymers, or polyolefins. Suitable thermosettable hot melt adhesives include moisture activated adhesives, light activated adhesives, radiation activated adhesives or combinations thereof Conventional thermosettable hot melt adhesive recognized by those skilled in the art are suitable for use in the present invention.

Thermosettable materials can include for example moisture cured urethanes, epoxy resins, and epoxy containing materials such as epoxy resins with thermoplastic materials. Examples of such materials include cpoxy/acrylate compositions such as those described in U.S. Pat. No. 5,086,088 (Kitano et al.), epoxy polyester compositions such as those described in WO 99/16618, published Apr. 8, 1999, and epoxy/ethylene vinyl acetate compositions such as those described in U.S. application Ser. No. 09/070,971, filed May 1, 1998, now U.S. Pat. No. 6,057,382 issued to Karim et al. Preferably, the thermosettable materials are provided in the form of a tape. The tape can further include one or more other layers such as a foam core, an adhesive layer, tie layers between the thermosettable material and the core or adhesive, primer layers, and the like.

In one embodiment of the present invention, the bonding agent is bonded to a non-conductive substrate and then subsequently applied onto the electrically-conductive substrate while utilizing the inventive method. The application process is often dependent upon the specific substrates and handling constraints of a particular application. For example, with hot melt adhesives it is necessary to heat the hot melt adhesive to a bondable state prior to application onto the electrically conductive substrate.

The method of the present invention is beneficial when the thermal conductivity of the electrically conductive substrate is greater than the thermal conductivity of the pressure sensitive adhesive or the bonding agent. Typically, the thermal conductivity of the electrically conductive substrate is greater than a factor of ten, and most preferably greater than a factor of 100.

The utilization of an activatable bonding agent, such as heat activated or radiation activated sealants, generally requires the activation of the hot melt adhesive. Generally, activation takes place immediately prior to application to the substrate. Alternatively, activation may occur after the hot melt adhesive is applied to the electrically conductive substrate. The activation can include exposing the bonding agent to visible light, infrared radiation or ultraviolet radiation.

Pressure sensitive adhesives and hot melt adhesives may be applied onto the non-conductive substrate in varying thicknessess. The present invention is directed to addressing the issue of the thermal dynamics at the outermost layer of the adhesive at the contact point with the electrically conductive substrate. In certain applications of hot melt adhesives, it may be desirable to utilize a relatively thick adhesive so that the adhesive may function as a sealant. For purposes of the invention, adhesives are generally considered sealants if the thickness of the adhesive is greater than 0.5 mm. With either hot melt adhesives or pressure sensitive adhesives, the heat from the electrically conductive substrate is directed toward addressing the solidification of the contact surface of the adhesive and not addressing the heating of the entire thickness of the adhesive layer.

Conventional induction heating systems are suitable for use in the method of the present invention. The energy rating of the system will vary depending on the substrates and bonding agents utilized in given applications. However, a preferred energy rating would be in the range of about 25 kilohertz to about 90 kilohertz. The power of the induction heating system is selected based upon the specific application. For example, certain electrically conductive substrates will require more power at a given frequency in order sufficiently heat the substrate. The induction heating system provides sufficient energy to heat the electrically conductive substrate to a temperature high enough to enhance the wet out of the bonding agent on the surface of the electrically conductive substrate. The conductive heat transfer from the substrate to the bonding agent should be maintained at a sufficient level to assist in the wetting process and delay the solidification of the outer surface of the bonding agent. Those skilled in the art of providing induction heating systems are capable of providing a system for specific substrates and bonding agent to achieve the enhanced bond formation according to the present invention.

The temperature limitations for the method of the present invention are dictated by the specifics of the desired substrates and bonding agents. The lower temperature limit will vary for selected bonding agents. Preferably, the temperature of the electrically conductive substrate achieves the tackification point of the bonding agent. The upper limitation of the induction heating system is generally dictated by the electrically conductive substrate. The temperature must not exceed the degradation temperature of the metal substrate. For example, the temperature of a painted metal substrate should not exceed the level where the bond between the paint and the metal is damaged. A preferred temperature range would be about 25° C. to about 140° C.

The elevated temperature of the electrically conductive substrate is sufficient to affect the wet out of the adhesive at the contact surface of the adhesive and electrically conductive substrate. The heat enhances the time constraints associated with bond formation in large scale manufacturing processes. The thermosettable hot melt adhesives used in the present invention are provided in a bondable state. A bondable state indicates that they have been activated and already have sufficient energy to cure upon application. Therefore, it is not necessary to provide energy, in the form of heat, through the electrically conductive substrate to activate the curing mechanism. The thickness of the material impacts the thermal cure gradient. However, those skilled in the art will recognize that the applied heat can effect the first order kinetic reaction and may have an impact on the acceleration of the cure.

The induction heating system is activated either prior to application of the bonding agent onto the electrically conductive substrate, after application of the bonding agent onto the electrically conductive substrate, or both. The system is preferably activated to maintain the surface temperature of the electrically conductive substrate above the tackification point of the bonding agent. The induction heating system is activated for a period of time sufficient to enhance wet out to the bonding agent. The duration will vary depending upon the particular bonding agent and the electrically conductive substrate. Those skilled in the art are capable of determining the time frame to achieve satisfactory wetting of the adhesive. Upon de-activation of the induction heating system, the bonding agent will begin to cool down and solidify to provide sufficient green strength. This is a very rapid process and is magnified as the mass of the electrically conductive substrates.

The induction heating system can be activated after application of the bonding agent onto the electrically conductive substrate. Preferably, the activation of induction heating occurs prior to solidification of the contact surface of the bonding agent. Those skilled in the art are capable of determining the time limitation for initiating the induction heating upon contact of the bonding agent to the electrically conductive substrates. The time limitations may vary for specific adhesives and applications.

The bond formed through the method of the present invention is generally stronger than bonds formed from conventional sealing practices. The improved wet out strengthens the bond as demonstrated through adhesion test results. The bonds formed through the use of the present invention generally result in cohesive failure while conventional practices result in adhesive failure. The stronger bond created by utilization of induction heating to improve the wet out is also demonstrated through the pluck test, fully described in the Examples section. The pluck test shows that bonds formed with the present inventive method require greater force to pull the substrates apart when compared to bonds formed from conventional practices.

The method of the present invention is suitable for bonding two separate substrates together through the application of a bonding agent. The substrates and bonding agents may vary for different practices. Preferably, the electrically conductive substrate is capable of reaching at least the tackification point of a given bonding agent. In a preferred application, the method of the present invention is suitable for bonding glass substrates to metal frames, for example a windshield in a motor vehicle. The utilization of the method in the production of motor vehicles enhances the use of particular bonding agents because they are able to achieve higher performing bonds in a shorter period of time. The ability to achieve green strength at a faster pace is particularly important under time constraints of a manufacturing assembly line.

A device suitable for practicing the method of the present invention is depicted in FIG. 1. The device 10 is generally a support 12 for releasably holding a substrate 20. The substrate 20 can be held directly by the support 12 or through various conventional attaching devices. For example, FIG. 1 depicts vacuum cups 18 attached to the support 12 for holding the substrate 20. A bonding agent (not shown) is affixed to at least a portion of the substrate 20. The support 12 generally holds the substrate 20 in position over an electrically conductive substrate (not shown). In an alternative embodiment, the support 12 is positioned about a periphery of the substrate 20 to apply pressure through the substrate 20 to the bonding agent. An induction heating system 14 is attached to at least a portion of the support 20. The induction heating system 14 is generally aligned with the selected bond line for the desired application. The device 10 can include a support arm 16 for positioning the substrate in close proximity to an electrically conductive substrate for formation of a bond. The induction heating system 14 is located in the support 12, or attached to it, and activated when the substrates are in their desired position. The induction heating system 14 is activated during application or after application to achieve the beneficial results of the present inventive method. Upon the development of sufficient green strength, the support 12 releases the substrate 20 and is moved away.

The following non-limiting examples further illustrate the present invention. Unless otherwise indicated, the following test procedures were used in the examples. The particular materials and amounts recited in these examples, as well as other conditions and details, are to be interpreted broadly in the art and should not be construed to unduly restrict or limit the invention in any way.

EXAMPLES

90 Degree Peel Adhesion

This test measures the peel adhesion force of a bonding material, e.g., adhesive or sealant, to various paint substrates using various induction heating times.

The test substrates used are metal panels painted with automotive paints as follows:

A—RK-8010 available from ACT, Hinsdale Mich.
B—DCT-5002 available from ACT, Hinsdale Mich.

The sealant or adhesive, provided on a release liner is cut into 1.27 cm by 10.16 cm strips. If there are two release liners, one of the release liners is removed and the exposed adhesive or sealant surface is placed on the panel using light hand pressure. A hand held unduction heating unit, such as the one disclosed in U.S. application Ser. No. 09/422,607 filed Oct. 21, 1999, and assigned Attorney Docket No. 55175USA1A, herein incorporated by reference, is utilized as the induction source for the Examples. The hand held induction heating head of the induction heating system (500 watt, 25 kiloHertz induction source made by Magneforce, Warren Ohio) is placed in contact with the release liner for each Example and moved along the strip by hand at one of two speeds as indicated: the first speed is approximately 12 inches/minute (30.48 cm/minute), and the second speed is approximately 4 inches per minute (10.16 cm/min). The induction heating time of a sample at the first speed is approximately 20 seconds, and the induction heating time of a sample at the second speed is approximately 60 seconds. After heating, the release liner on the strip is removed and the exposed surface is laminated to a 127 micrometer thick strip of anodized aluminum foil with one pass of 6.8 kg roller at a speed of approximately 30.48 cm/min to form a test sample. Test samples are also prepared in a like manner without induction heating. Test samples at various aging times (Aging Time on Paint) are tested immediately after lamination, after aging 20 minutes at 21 ° C, after aging 1 hour at 21° C., and after aging 24 hours at 21° C., using an Instron™ tensile tester to peel the aluminum foil from the painted panel at a 90 degree angle at a crosshead speed of 30.48 cm/minute. Two samples are tested at each condition and the average peel adhesion value (Peel Adh) is reported in the examples below in Newtons/decimeter (N/dm). The failure mode is also noted as: POP-the strip of tape pulls cleanly off of the painted surface leaving little if any residue, COH-the strip of tape splits leaving portions of adhesive on both the painted surface and on the aluminum foil and/or the foam tape, if present, splits, and MIX where both failure modes occurred in the sample.

Pluck Test

This test measures the force required to pull or pluck a piece of glass away perpendicularly from a painted metal panel to which it is bonded with a sealant or adhesive.

The painted test substrates are the same as those described in the peel adhesion test. A 69.9 mm by 38.1 mm by 5.8 mm thick glass plate is cleaned with a 50/50 mixture of isopropyl alcohol and water. After drying the glass, it is primed by wiping with an adhesion promoter (Chemlok AP-134 Adhesion Promoter available from Lord Corporation—Erie Pa.) and dried for about 10 minutes at 21° C.

A 1.27cm by 1.27 cm square sample of adhesive or sealant is cut and applied to the surface of the painted panel. The primed glass surface is then placed on top of the sample and pressed onto it with firm hand pressure. The induction heater described in the 90 Degree Peel Adhesion Test is placed on the glass above the sealant for 2 different times —30 seconds and 60 seconds. A control with no induction heating is also conducted. The samples are then tested immediately after heating, after aging 20 minutes at 21° C., after aging 60 minutes at 21° C., and after aging 24 hours at 21° C. The samples are tested using an InstronTmTensile Tester. The panel is clamped in the jaw of the crosshead, and the lateral edges of the glass plate are clamped in the upper jaw so that the glass is plucked away perpendicularly from the panel at a speed of 1 inch/minute (2.54 cm/min.) The peak load value is recorded in pounds per 0.25 square inch and presented in the table below in kilopascals (Pluck kPa). The failure mode is also noted according to the criteria described in the 90 degree Peel Adhesion Test.

Example 1

A 2.54 mm thick adhesive foam tape was prepared by mixing 90 parts of isooctyl acrylate, 10 parts of acrylic acid, and 0.04 parts of a photoinitiator (benzil dimethyl ketal available as Irgacure™ 651 from Ciba Geigy). The mixture was exposed to low intensity ultraviolet radiation to a viscosity of about 2200 centipoise. An additional 0.1 parts of benzil dimethyl ketal was added as well as 0.08 parts of 1,6-hexanedioldiacrylate, 6 parts K15 glass bubbles, and 1.5 parts of hydrophobic silica (Aerosil™ R972). The composition was mixed until it was uniform throughout, degassed, and then pumped into a 90 mm frother (available from E.T. Oakes, Hauppage, N.Y.) operating at about 300 to 350 rpm. Concurrently, and continuously, nitrogen, black pigment (PennColor 9B117), and approximately 1.5 parts of a 60/40 mixture of surfactant A/surfactant B were fed into the frother per 100 parts of the total composition. The nitrogen was controlled to provide the desired foam density. Surfactant A was $C_8F_{17}SO_2N(C_2H_5)(C_2H_4O)_7CH_3$ and surfactant B was a 50% solids solution in ethyl acetate of the fluoroaliphatic oligomer of Example 2 of U.S. Pat. No. 3,787,351. The black pigment was added in an amount to provide a finished product L value of about 40 as measured with a Hunter Lab calorimeter (Color 'L' colorimeter and a D25 Optical Sensor, both available from HunterLab Associates, Reston Va.). The frothed mixture was delivered under a pressure of 205 kiloPascals to the nip of a roll coater to a thickness of about 2.54 mm between a pair of sheets of transparent, biaxially-oriented polyethylene terephthalate, the facing surfaces of which had release coatings, to produce a composite. The tubing was partially constricted by a clamp to provide the desired level of pressure in the frother. The composite emerging from the roll coater was irradiated from both the top and bottom with banks of Sylvania fluorescent black light bulbs, 90% of the emissions of which were between 300 and 400 nm, with a maximum of 351 nm. The composite was successively exposed to the bulbs at an intensity of 4.5 milliwatts per square centimeter ($mW/cm^2$) and a total energy of 280.9 millijoules per square centimeter ($mJ/cm^2$) each from the top and bottom, then likewise to an intensity of 6.5 $mW/cm^2$ and a total energy of 405.6 $mJ/cm^2$, and then likewise to an intensity of 7.5 $mW/cm^2$ and a total energy of 656.9 $mJ/cm^2$. Light measurements were measured in NIST units. The cured foam had a density of 0.59 $g/cm^3$.

The tape was used as the test adhesive on two automotive paints, different induction heating times, and different room temperature aging times as described in the Peel adhesion test. Test results are shown in Table 1.

Similarly, samples of adhesive foam tape measuring 1.27 cm by 1.27 cm were tested according to the Pluck Test described above. Test results are shown in Table 2.

TABLE 1

Peel Adhesion Values

| | Induction Time | | | | | |
|---|---|---|---|---|---|---|
| | 0 Sec | | 20 sec | | 60 sec | |
| Aging Time on Paint | Peel Adh - N/dm | Failure Mode | Peel Adh - N/dm | Failure Mode | Peel Adh - N/dm | Failure Mode |
| A-no aging | 24.5 | POP | 38.5 | POP | 108.6 | COH |
| A-20 minutes | 42 | POP | 61.3 | POP | 145.4 | MIX |
| A-60 minutes | 52.6 | POP | 80.55 | POP | 152.4 | MIX |
| A-24 hours | 68.3 | POP | 78.8 | POP | 162.9 | COH |
| B-no aging | 26.2 | POP | 42.2 | POP | 85.8 | MIX |
| B-20 minutes | 52.6 | POP | 59.6 | POP | 197.8 | MIX |
| B-60 minutes | 52.6 | POP | 66.6 | POP | 204.8 | MIX |
| B-24 hours | 63.1 | POP | 71.8 | POP | 183.8 | COH |

The data in Table 1 show the advantage of induction heating for bonding an adhesive tape to various paint substrates with varying aging times. In general, induction heating of the substrate increases the wet out and interaction of the adhesive to the surface as indicated by the increase in adhesion values upon use of induction heating. The ability to rapidly build adhesion can have significant impact on the ability of an adhesive system to achieve a requisite level of performance in several manufacturing situations such as installing or assembling components for an automobile. The data show that the rate of increase in peel adhesion values is greater with induction heating than is achieved with only aging at room temperature. Additionally, the values approach the ultimate values that can be achieved as evidenced by the failure modes becoming mixed and cohesive. It is noted that the mixed failure modes and slightly lower adhesion values on samples with induction heating but no aging time may be the result of reduced modulus of the foam tape from heating.

TABLE 2

Pluck Values

| | Induction Time | | | | | |
|---|---|---|---|---|---|---|
| | 0 Sec | | 30 Sec | | 60 sec | |
| Aging Time on Paint | Pluck Kpa | Failure Mode | Pluck kpa | Failure Mode | Pluck KPa | Failure Mode |
| A-immediate | 198.6 | POP | 182.0 | FS | 193.1 | FS |
| A-20 minutes | 204.1 | POP | 303.4 | POP | 350.3 | FS |
| A-60 minutes | 182.3 | POP | 217.9 | POP | 366.8 | FS |
| A-24 hours | 237.2 | POP | 220.6 | POP | 303.4 | MIX |
| B-immediate | 184.8 | POP | 63.4 | POP | 157.2 | POP |
| B-20 minutes | 228.9 | POP | 237.2 | POP | 226.2 | POP |
| B-60 minutes | 190.3 | POP | 212.4 | POP | 259.23 | POP |
| B-24 hours | 242.7 | POP | 248.2 | POP | 295.1 | MIX |

The data in Table 2 show the advantage of induction heating of a surface to improve the wet out of the adhesive, and thereby increase the adhesion to both a painted panel and a glass plate. As the induction heating time is increased, the force required to pluck the glass plate from the panel increases, and the failure mode was improved on both types of painted surfaces.

Example 3

A moisture curing hot melt (3M Jet-Weld TS-230 Thermoset Adhesive available from 3M Company, St. Paul Minn.) was heated and applied from the applicator gun at a temperature of 118° C. directly to a cleaned and primed glass surface in a square of about 1.27 cm by 1.27 cm and a thickness of approximately 2 mm. The bonding agent and glass samples were immediately applied to Paint substrate B with 2 mm thick spacers to maintain the bond line thickness and prevent the hot melt from squeezing out. The samples were then either exposed to induction heating for 30 seconds or allowed to bond with no induction heating. Each Example was then aged for about 24 hours before testing. Results are shown in Table 3. The Examples bonded with induction heating exhibited a desired cohesive failure when subjected to the pluck test.

Example 4

A 1.27 cm by 1.27 cm square of the foam tape of Example 1 was applied to glass using hand pressure. The moisture curing hot melt of Example 3 was applied to the surface of the foam tape so that entire surface of the foam was covered with hot melt but taking care to avoid letting the hot melt run over the edge and encapsulating the foam tape. The bonding agent and glass sample was then applied to Paint substrate B using light hand pressure to ensure contact of the entire hot melt surface to the glass. Some of the hot melt was observed to squeeze out of the bondline during this preparation step. One sample was subjected to induction heating and another bonded without induction heating. The sample was exposed to the induction heating for 30 seconds immediately after application onto the substrate. The samples were aged for 24 hours and tested according to the Pluck Test. Test results are shown in Table 3. The data in Table 3 indicates the enhanced adhesion of both Examples 3 and 4 after the utilization of induction heating.

TABLE 3

Pluck Test

| | Induction Time | | | |
|---|---|---|---|---|
| | 0 Seconds | | 30 Seconds | |
| | Pluck - kpa | Failure Mode | Pluck - kpa | Failure Mode |
| Example 3 | 0 | POP | 2057.4 | COH |
| Example 4 | 317.2 | FS | 2843.4 | COH |

Example 5

A 1.27cm by 10.16 cm strip of the foam adhesive tape of Example 1 was applied to 5.08 cm by 12.7 cm piece of glass (primed with AP-134 Adhesion Promotor) by centering the tape on the glass and pressing firmly with hand pressure. The hot melt adhesive of Example 3 was then applied at 118° C. to the surface of the foam tape by centering it in the middle of the foam and allowing it to flow out to cover the surface of the foam with a layer of adhesive approximately 1mm thick. The adhesive and foam tape were immediately covered with a low density polyethylene film such that hot melt adhesive was entirely covered by the film and the film adhered to the edges of the tacky foam tape creating a closed environment for the hot melt adhesive. The composite article was aged for 4 hours under room temperature conditions. The film was then removed cleanly from the adhesive surface and the glass composite was heated for 5 minutes in an oven set at 120° C. The composite was removed from the oven and adhered to painted substrate B using firm hand pressure to the glass surface. Some squeeze out of the moisture cure hot melt was observed to occur during pressing. The hand held induction heater was then placed on the glass surface and moved at a rate of approximately 15 seconds per inch (speed of 10.16 cm/min). After aging the composite for 24 hours at room temperature the glass was pulled by hand from the painted panel causing a mixed mode of failure including foam COH, POP, and paint removal from the steel panel. This example illustrates a two-layered tape construction having a foam layer and a moisture curable layer which was protected from ambient moisture with a film. The use of induction heating allowed the curable tape to achieve a high strength bond to both the glass and the painted surfaces as evidenced by the mixed failure modes.

Example 6

A sealant composition having 45 parts of ethylene resin (Elvaloy 741 available from DuPont Co.), 20 parts of epoxy resin (ERL 4221 available from Union Carbide), 35 parts of a hydrocarbon tackifier (Escorez EC 180 available from Exxon Chemical Co.), and 0.2 parts of an epoxy curative composition was extruded into a strand having a trapezoidal cross-section. A tape was prepared by casting the strand onto the surface of a 4 mm thick and 127 mm wide foam tape on a release liner prepared described in Example 1, with the base of the trapezoid on the foam. The epoxy curative composition was a 50/50 blend of caprolactone and (eta$^6$-m-xylene) (eta$^5$-cyclopentadienyl)iron (1+) hexafluoroantimonate as disclosed in U.S. Pat. No. 5,089,536 (Palazzotto). The trapezoidal cross-section had a height of 9 mm, base width of 9.5 mm and an apex width of 3 mm. The extruder was a 19 mm BP extruder with five heating zones. The temperatures were set as follows: Zone 1—40° C., Zone 2—95° C., Zone 3—° C., Zones 4 and 5—105° C., and the speed was 250 rpm.

A test assembly was prepared by placing a 101.6 mm by 304.8 mm by 1.65 mm thick thick anodized aluminum plate on a slate lab bench. A metal panel painted with DCT-5002 paint having the same dimensions was placed directly over the plate with a thermocouple sensor (Fluke 52 dual thermocouple with K-type sensors) positioned between the panel and the plate. A second thermocouple sensor was placed on the painted panel in a position directly above the first sensor.

A strip of tape 100 mm long was cut and positioned with the foam side on a 0.1 mm thick biaxially oriented polyester release liner. This composite was placed in an oven set at 120° C. for the 3 minutes at which time the surface of the sealant appeared fluid. Immediately after heating, the tape was placed on top of the second sensor and the painted panel with the sealant against the panel and sensor. The tape was pressed lightly so that approximately 3 mm of sealant squeezed out around the perimeter of the foam. The temperatures were then monitored and recorded for 300 seconds with the first sensor between the plates indicating the metal substrate temperature ($T_m$) and the second sensor indicating the sealant temperature ($T_s$) for the first test. The test was repeated except that immediately after pressing the composite onto the panel and sensor, the induction heater described in Example 1 was placed on top of the polyester film in a position approximately over the sensors. The induction heater was held in place for 30 seconds at which time the metal substrate reached a temperature of 224° C. and the heater was turned off. The temperatures for both tests are shown in Table 4.

TABLE 4

| Time | 3 minutes oven heating | | 3 minutes oven heating followed with induction | |
|---|---|---|---|---|
| (seconds) | $T_m$ ° C. | $T_s$ ° C. | $T_m$ ° C. | $T_s$ ° C. |
| 0 | 72 | 72 | 72 | 72 |
| 5 | 72 | 156 | 79 | 159 |
| 10 | 75 | 146 | 90 | 173 |
| 15 | 75 | 143 | 117 | 174 |
| 20 | 76 | 140 | 147 | NA* |
| 25 | 77 | NA | 186 | NA |
| 30 | 77 | 135 | 224** | 173 |
| 40 | 78 | 129 | 201 | 167 |
| 50 | 79 | 125 | 188 | 164 |
| 60 | 80 | 121 | 175 | 157 |
| 70 | 80 | 118 | 162 | 153 |
| 80 | 80 | 117 | 147 | 150 |
| 90 | 80 | 113 | 141 | 143 |
| 100 | 80 | 112 | 134 | 139 |
| 110 | 79 | 108 | 128 | 136 |
| 120 | 79 | 107 | 125 | 132 |
| 130 | 79 | 103 | 117 | 128 |
| 140 | 79 | 102 | 114 | 127 |
| 150 | 79 | 101 | 110 | 123 |
| 160 | 79 | 98 | 109 | 120 |
| 170 | 78 | 97 | 106 | 118 |
| 180 | 78 | 96 | 105 | 115 |

TABLE 4-continued

| Time | 3 minutes oven heating | | 3 minutes oven heating followed with induction | |
|---|---|---|---|---|
| (seconds) | $T_m$ ° C. | $T_s$ ° C. | $T_m$ ° C. | $T_s$ ° C. |
| 190 | 78 | 95 | 100 | 111 |
| 200 | 78 | 94 | 100 | 110 |
| 210 | 77 | 92 | 99 | 109 |
| 220 | 77 | 91 | 97 | 108 |
| 230 | 77 | 90 | 96 | NA |
| 240 | 77 | 89 | 95 | 103 |
| 250 | 77 | 88 | 93 | 102 |
| 260 | 76 | 88 | 92 | 101 |
| 270 | 76 | 87 | 91 | 100 |
| 280 | 76 | 86 | 90 | 98 |
| 290 | 76 | 86 | 89 | 97 |
| 300 | 76 | 85 | 88 | 95 |

*NA—measurement not available
**Induction heating stopped

The data in Table 4 show that even though the sealant is much hotter than the substrate, the amount of heat transferred to the substrate caused a temperature rise in the substrate of only about 8 degrees to 80° C. This temperature is well below the solidification temperature of the sealant. The tape test assemblies were cooled to room temperature and pried apart with a metal spatula. The assembly from the first test exhibited an adhesive failure in which the sealant pulled cleanly away from the painted metal panel. This indicated that on contact with the metal panel the sealant, even though the adhesive was fluid, was cooled sufficiently to quench the sealant surface so that adequate wet out of the metal paint panel was not achieved. The second fixture with induction heating exhibited a cohesive failure. Additionally, the sealant flowed from the bond line indicating that the sealant was fluid enough to spontaneously wet out the painted panel.

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. A bonding method, comprising:
   (a) providing a non-conductive substrate with a bonding agent bonded to at least a portion of said non-conductive substrate, said bonding agent comprising a pressure sensitive adhesive or a hot melt adhesive, said hot melt adhesive heated to a bondable state;
   (b) heating an electrically conductive substrate with an induction heating system, said electrically conductive substrate suitable for receiving the pressure sensitive adhesive or hot melt adhesive of said bonding agent, said electrically conductive substrate having a greater thermal conductivity than the pressure sensitive adhesive or hot melt adhesive, wherein said electrically conductive substrate is heated to enhance the wet out of the pressure sensitive adhesive or hot melt adhesive upon application to the electrically conductive substrate; and
   (c) contacting the bonding agent with the electrically conductive substrate.

2. The method as recited in claim 1, wherein said bonding agent comprises a hot melt adhesive, and said hot melt adhesive is a thermosettable adhesive.

3. The method as recited in claim 2, further comprising activating said hot melt adhesive prior to contacting the electrically conductive substrate.

4. The method as recited in claim 3, wherein activating said hot melt adhesive comprises exposing said hot melt adhesive to visible light, infrared radiation or ultraviolet radiation.

5. The method as recited in claim 1, wherein said bonding agent forms a cohesive bond between said electrically conductive and non-conductive substrates as indicated by peel adhesion test results.

6. The method as recited in claim 1, wherein said heating with an induction heating system occurs prior to application and contact of said bonding agent to said electrically conductive substrate.

7. The method as recited in claim 1, wherein said heating with an induction heating system occurs after contacting said bonding agent with said electrically conductive substrate.

8. The method as recited in claim 7, wherein said bonding agent comprises said hot melt adhesive and said induction heating takes place prior to any solidification of a surface of said hot melt adhesive in contact with said electrically conductive substrate.

9. The method as recited in claim 1, wherein said hot melt adhesive is selected from the group consisting of thermoplastic hot melt adhesives, moisture activated adhesives, light activated adhesives, radiation activated adhesives or combinations thereof.

10. The method as recited in claim 1, wherein said induction heating system is operated at a frequency in the range of about 25 kilohertz to about 90 kilohertz.

11. The method as recited in claim 1, wherein said electrically conductive substrate is heated to a temperature within the range of about 25° C. to about 140° C.

12. The method as recited in claim 1, wherein said non-conductive substrate is glass.

13. The method as recited in claim 12, wherein said glass is a glazing for a motor vehicle.

14. The method as recited in claim 1, wherein said bonding agent is heated prior to contacting the electrically conductive substrate.

15. The method as recited in claim 1, wherein said bonding agent comprises a thermosettable hot melt adhesive, and said method further comprises activating said thermosettable hot melt adhesive prior to contacting the electrically conductive substrate, wherein activating said thermosettable hot melt adhesive comprises exposing said thermosettable hot melt adhesive to visible light, infrared radiation or ultraviolet radiation.

16. A bonding method, comprising:

providing a glass substrate with a bonding agent bonded to at least a portion of said glass substrate, said bonding agent comprising a pressure sensitive adhesive or a hot melt adhesive, said hot melt adhesive heated to a bondable state;

heating an electrically conductive frame with an induction heating system, said electrically conductive frame suitable for receiving the pressure sensitive adhesive or hot melt adhesive of said bonding agent, said electrically conductive substrate having a greater thermal conductivity than the pressure sensitive adhesive or hot melt adhesive, and applying said glass onto said electrically conductive frame so that the pressure sensitive adhesive or the hot melt adhesive contact said electrically conductive frame, wherein said heated electrically conductive frame enhances the wet out of the pressure sensitive adhesive or hot melt adhesive.

17. The method as recited in claim 16, wherein said heating occurs either prior to application of the pressure sensitive adhesive or hot melt adhesive, during application of the pressure sensitive adhesive or hot melt adhesive, after application of the pressure sensitive adhesive or hot melt adhesive, or combinations thereof.

18. The method as recited in claim 16, wherein said frame is painted metal.

19. A bonding method, comprising:

applying a curable hot melt adhesive onto at least a portion of an outer surface of a non-conductive substrate;

heating the curable hot melt adhesive to a first temperature, wherein the first temperature is above a solidification temperature of the curable hot melt adhesive;

heating one or more adhesive-free bonding sites on an electrically conductive substrate to a second temperature using an induction heating system, wherein the second temperature is above the solidification temperature of the curable hot melt adhesive; and bonding the curable hot melt adhesive on the non-conductive substrate to the one or more adhesive-free bonding sites on the electrically conductive substrate.

20. The method as recited in claim 19, wherein said method further comprises activating the curable hot melt adhesive prior to or during heating of the curable hot melt adhesive, wherein activating the curable hot melt adhesive comprises exposing the curable hot melt adhesive to visible light, infrared radiation or ultraviolet radiation.

* * * * *

UNITED STATES PATENT AND TRADEMARK OFFICE
CERTIFICATE OF CORRECTION

PATENT NO.    : 6,313,448 B1                                           Page 1 of 1
DATED         : November 6, 2001
INVENTOR(S)   : Michael A. Johnson It is certified that error appears in the above-identified patent and that said Letters Patent is hereby corrected as shown below:

<u>Title page, item [54] and Column 1, lines 1 and 2,</u>
The title should read -- A METHOD OF BONDING A CONDUCTIVE SUBSTRATE TO A NONCONDUCTIVE SUBSTRATE USING INDUCTION HEATING --.

<u>Column 5,</u>
Line 31, "thereof Conventional" should read -- thereof. Conventional --.

<u>Column 8,</u>
Line 43, delete "and assigned Attorney Docket No. 55175USA1A".

<u>Column 16,</u>
Line 27, "at Ieast" should read -- at least --

Signed and Sealed this

Seventeenth Day of December, 2002

JAMES E. ROGAN
*Director of the United States Patent and Trademark Office*